US008746736B2

(12) United States Patent
Mendez et al.

(10) Patent No.: US 8,746,736 B2
(45) Date of Patent: Jun. 10, 2014

(54) AIRBAG MODULE

(75) Inventors: Gerardo Mendez, West Bloomfield, MI (US); Amy L. Klinkenberger, Highland, MI (US)

(73) Assignee: TK Holdings Inc., Auburn Hills, MI (US)

(*) Notice: Subject to any disclaimer, the term of this patent is extended or adjusted under 35 U.S.C. 154(b) by 349 days.

(21) Appl. No.: 13/175,561

(22) Filed: Jul. 1, 2011

(65) Prior Publication Data

US 2012/0001408 A1 Jan. 5, 2012

Related U.S. Application Data

(60) Provisional application No. 61/361,035, filed on Jul. 2, 2010.

(51) Int. Cl.
*B60R 21/26* (2011.01)

(52) U.S. Cl.
USPC .......................................... 280/736; 280/743.2

(58) Field of Classification Search
USPC .............................. 280/743.1, 743.2, 739, 736
See application file for complete search history.

(56) References Cited

U.S. PATENT DOCUMENTS

| 6,126,196 | A | * | 10/2000 | Zimmerman | 280/739 |
| 6,648,371 | B2 | * | 11/2003 | Vendely et al. | 280/739 |
| 6,773,027 | B2 | * | 8/2004 | Bohn et al. | 280/729 |
| 7,118,127 | B2 | * | 10/2006 | Damm | 280/739 |
| 7,600,782 | B2 | * | 10/2009 | Ishiguro et al. | 280/739 |
| 7,625,007 | B2 | * | 12/2009 | Sekizuka | 280/739 |
| 8,491,004 | B2 | * | 7/2013 | Mendez et al. | 280/739 |
| 2011/0254256 | A1 | * | 10/2011 | Mendez et al. | 280/743.2 |

FOREIGN PATENT DOCUMENTS

| JP | 06286568 A | * | 10/1994 | B60R 21/28 |
| JP | 06286570 A | * | 10/1994 | B60R 21/28 |

* cited by examiner

*Primary Examiner* — Faye M. Fleming

(74) *Attorney, Agent, or Firm* — Foley & Lardner LLP

(57) ABSTRACT

An airbag module comprising an inflatable airbag cushion that includes a vent hole and a vent pocket, an inflator for inflating the airbag cushion, an actuator, a vent member configured to fill at least a portion of the vent pocket to selectively cover the vent hole, and a tether having a first end and a second end. The first end of the tether is coupled to the vent member and the second end is coupled to the actuator. When the actuator has not been activated, the vent member remains in a first position covering the vent hole under a tension applied by the tether to thereby prevent inflation gas from escaping through the vent hole. When the actuator has been activated, the tension is reduced enough to allow the inflation gas to move the vent member to a second position uncovering the vent hole thereby allowing inflation gas to escape through the vent hole and through the vent member.

20 Claims, 16 Drawing Sheets

AIRBAG MODULE

CROSS-REFERENCE TO RELATED PATENT APPLICATIONS

This application claims priority to and the benefit of U.S. Provisional Patent Application No. 61/361,035, filed on Jul. 2, 2010. The foregoing provisional application is incorporated by reference herein in its entirety.

BACKGROUND

The present application relates generally to the field of airbags for use in motor vehicles. More specifically, this application relates to an airbag module with an electromechanical active cushion venting mechanism to control internal chamber pressure of the airbag cushion to reduce acceleration and forces of the occupant, such as the head and neck of the occupant, during airbag deployment to improve occupant safety.

SUMMARY

One embodiment of the invention relates to an airbag module for providing restraint to an occupant of a vehicle. The airbag module comprises an inflatable airbag cushion that includes a vent hole and a vent pocket, an inflator for generating inflation gas to inflate the airbag cushion during deployment, an actuator, a vent member configured to fill at least a portion of the vent pocket to selectively cover the vent hole, and a tether having a first end and a second end. The first end of the tether is coupled to the vent member and the second end of the tether is coupled to the actuator. When the actuator has not been activated, the vent member remains in a first position covering the vent hole under a tension applied by the tether to thereby prevent inflation gas from escaping through the vent hole. When the actuator has been activated, the tension is reduced enough to allow the inflation gas to move the vent member to a second position uncovering the vent hole thereby allowing inflation gas to escape through the vent hole and through the vent member.

Another embodiment of the invention relates to an airbag module for providing restraint to an occupant of a vehicle. The airbag module comprises an inflatable airbag cushion having a vent hole, an inflator for generating inflation gas to inflate the airbag cushion during deployment, and a vent member having a first stored position and a second open position. When the vent member is in the first stored position the vent member includes at least one fold and covers the vent hole to thereby prevent inflation gas from escaping therethrough. When the vent member is in the second open position, the vent hole is uncovered to thereby allow inflation gas to escape therethrough. When in the first stored position the vent member of the airbag module may also include a second fold and/or a roll.

DETAILED DESCRIPTION

Figure 1:
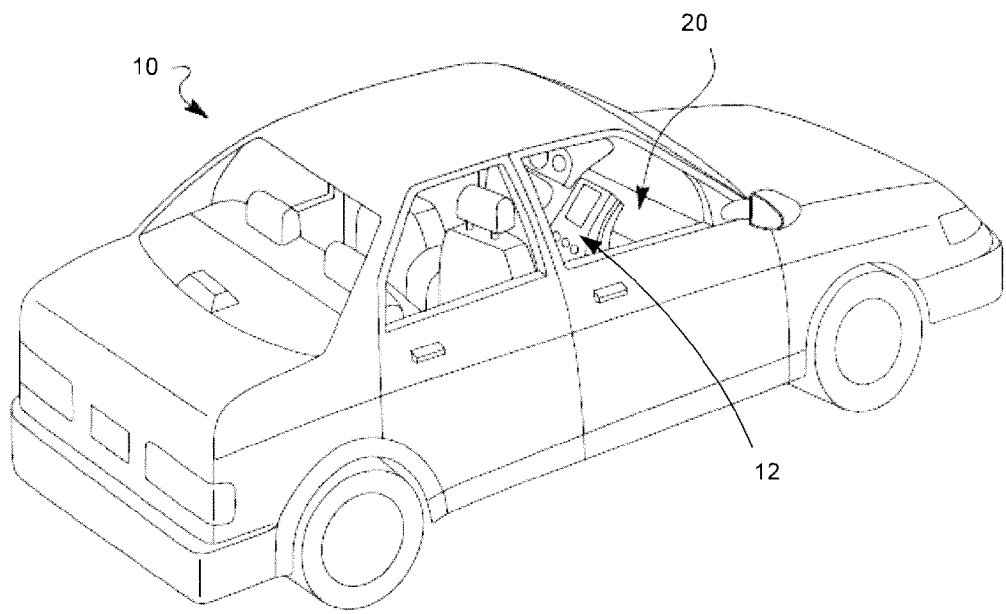
FIG. 1 is a perspective view of an exemplary embodiment of a motor vehicle having an airbag module.

Airbag modules generally provide occupant restraint during a dynamic vehicle event, such as a frontal or side impact, to reduce the likelihood of injury to the restrained occupant. Airbag modules provide occupant restraint by including an inflatable airbag cushion that deploys and inflates from gas rapidly pushed into the airbag cushion by means of an inflator, whereby the cushion deploys between the occupant being restrained and another portion of the vehicle, such as the dashboard or door assembly. The airbag cushion may reduce displacement and acceleration of the occupant to reduce the reaction forces imparted to the occupant, as well as absorb energy upon impact by the occupant. An inflator or module may use a device, such as a pyrotechnic device or other airbag inflation device, to generate gas almost instantaneously and to push the gas at a high volumetric flow rate into the inflatable airbag cushion of the airbag system. Airbag modules and airbag cushions may be stored within and deployed from any vehicle component, such as the dashboard or the steering column. Airbags are typically packaged through a process of folding and rolling to compact the airbag in order for the airbag to fit into the small cross-section of the storage area. Airbags may be used to provide restraint to any occupant located in any seating row (e.g., first, second, third) of a vehicle.

The airbag modules disclosed herein include electromechanical active cushion venting mechanisms to control the internal pressure of the airbag cushion relative to time, during airbag deployment, to improve occupant restraint. The airbag modules disclosed herein may have active venting mechanisms that may remain closed during the initial stage of airbag deployment (e.g., 0-20 milliseconds) in order to allow the airbag to build internal chamber pressure quickly to deploy quickly and provide restraint to the occupant as quickly as possible. However, the active venting mechanisms disclosed herein may be selectively opened at any time during the airbag deployment, such as during the later stages of deployment (e.g., 20-80 milliseconds), to improve the ride down (i.e., the time following the initial impact between the airbag cushion and occupant) of the occupant load to reduce the acceleration (e.g., head acceleration) of the occupant compared to conventional airbags having higher internal chamber pressures (and hence increased stiffness), which have a tendency to increase the acceleration to restrain the occupant.

The vehicle may include sensors to monitor crash severity, wherein the sensors may communicate one or more measured input parameters in the form of data to a vehicle device, such as an electronic control module, which may determine crash severity based on the received data, then communicate with the airbag module to tailor the airbag internal pressure through the active cushion venting mechanism. The active venting mechanism may control the amount of gas permitted to escape through the active vent opening by adjustment of the vent member 50 to tailor the internal airbag pressure to provide optimal occupant restraint based on the crash severity of the vehicle. The active venting mechanism may be configured in a closed position to prohibit or substantially limit inflation gas from escaping the airbag cushion, during deployment, such as during the initial moments of vehicle impact, in order for the internal pressure to build rapidly to increase the speed of deployment and initial restraint of the occupant. The active venting mechanism may subsequently be adjusted to an open position to permit inflation gas to escape to reduce the internal pressure of the airbag cushion, which improves the ride down of the occupant load and reduces the head acceleration, relative to a cushion having a higher stiffness or internal pressure.

FIG. 1 illustrates an exemplary embodiment of a vehicle 10 (e.g., a motor vehicle) that includes a passenger compartment 12 having at least one airbag module 20 configured to provide occupant restraint and a seat 16 for the occupant to sit there upon. The vehicle 10 is shown as a typical sedan, but the airbag modules disclosed herein may be included in any vehicle having at least one occupant where passive restraint of the occupant is desired. Additionally, the airbag modules disclosed herein may be used to provide occupant restraint during any vehicle impact event (e.g., frontal impact, side impact) and may restrain any occupant (e.g., driver, passenger), as the illustrations herein are not meant as limitations.

Figure 2:
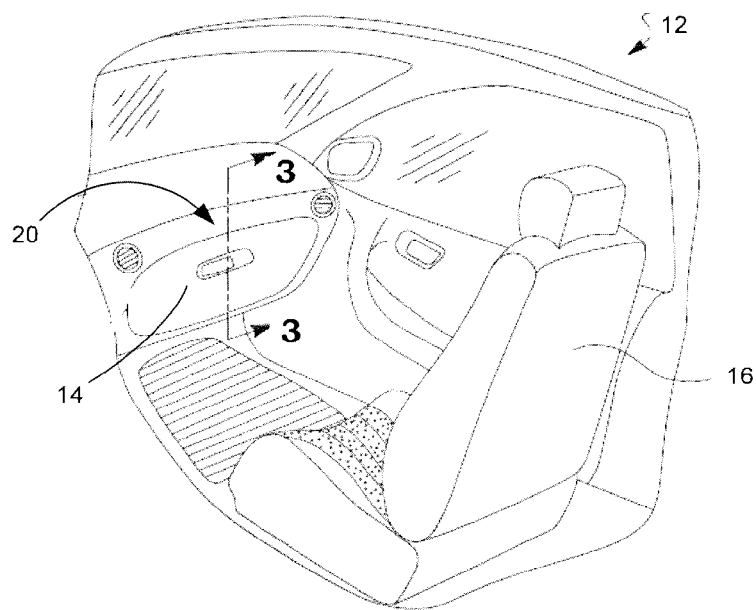
FIG. 2 is a perspective view of an exemplary embodiment of an interior compartment of a motor vehicle, such as the motor vehicle in FIG. 1.
Figure 3:
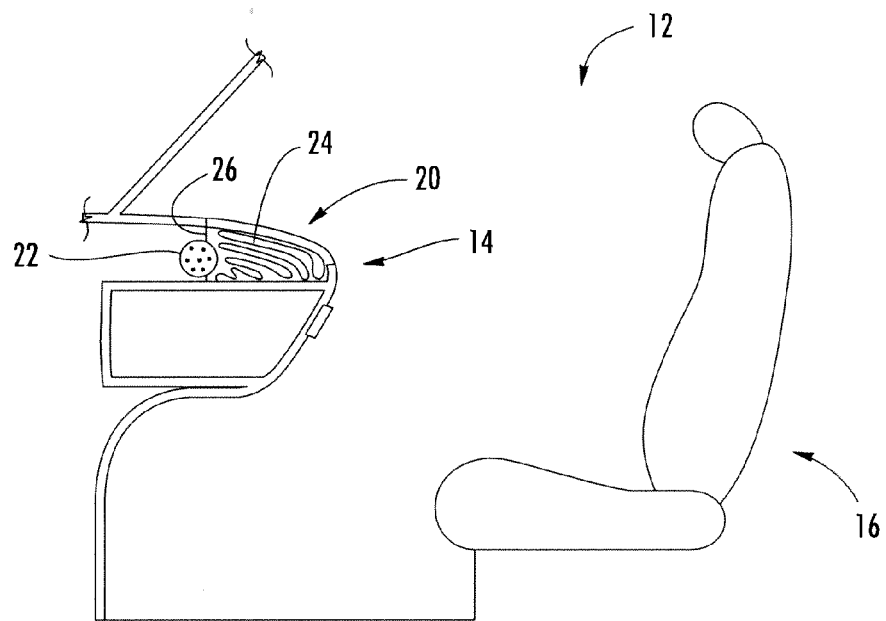
FIG. 3 is a cross-sectional side view of the interior compartment of FIG. 2, taken along line 3-3.
Figure 4:
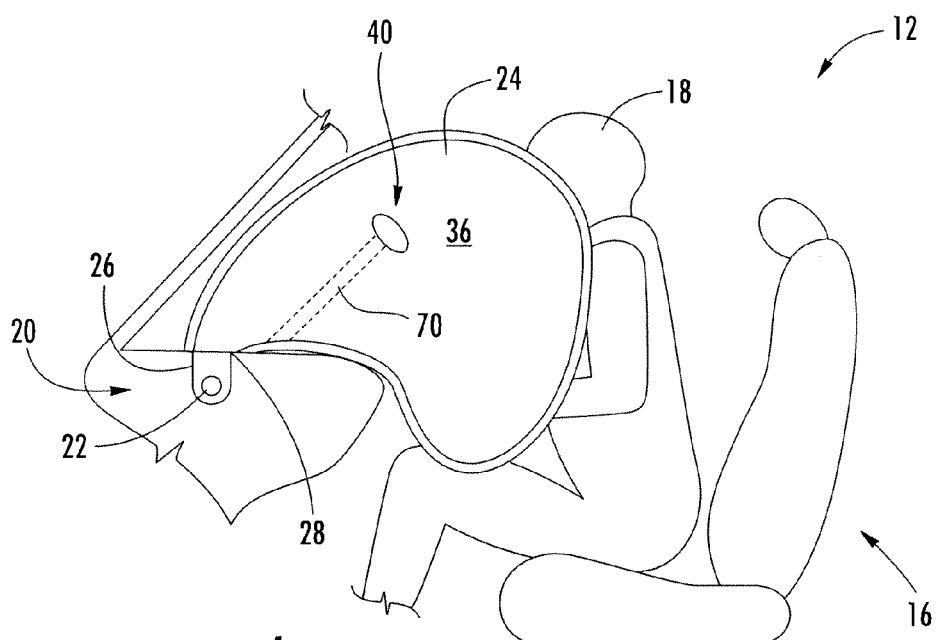
FIG. 4 is a side view of an airbag module shown deployed from the dashboard of the vehicle to restrain the occupant of the seat assembly.

FIGS. 2-4 illustrate a passenger compartment 12, according to an exemplary embodiment. The passenger compartment 12 includes an airbag module 20, which is shown deployed in FIG. 4 from a dashboard 14 of the vehicle 10, to provide restraint to the seated occupant 18 during a frontal impact of the vehicle 10. Although the airbag module 20 is a front airbag configured to restrain the passenger of the vehicle, it should be noted that the airbag modules disclosed herein may be configured for use in any type of airbag (e.g., side-impact, knee airbags, driver-side torso airbags, etc.) to restrain any vehicle occupant, and the illustrations herein should not be considered as limitations.

Figure 26:
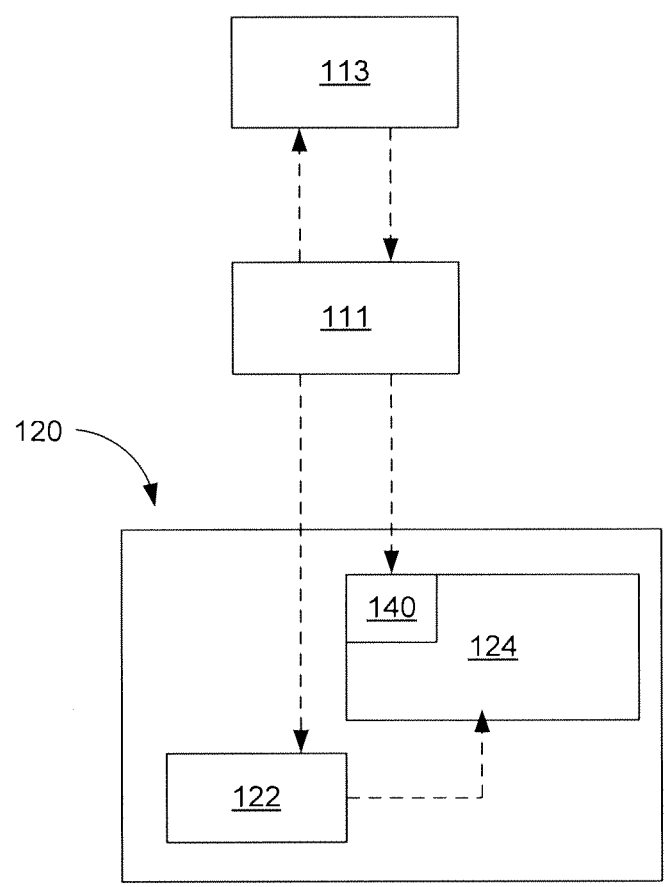
FIG. 26 is a schematic of an airbag module in communication with an electronic control module of a vehicle.

According to an exemplary embodiment, the airbag module 20 may include an inflatable airbag cushion 24, an inflator 22 for inflating the airbag cushion 24, a housing 26, and an active cushion vent mechanism 40. The inflator 22 and housing 26 may be configured using any suitable method. The inflator 22 may be coupled to the housing 26 and may provide inflation gas to the airbag cushion 24 during deployment of the airbag module 20. The housing 26 may provide structural support to the airbag module 20 and may provide for attachment (e.g., coupling) of the airbag module 20 to the vehicle 10, such as coupling to the dashboard 14 of the vehicle 10. The airbag cushion 24 may be coupled to the inflator 22 and/or the housing 26 at a fixing location 28, so that inflation gas when generated by the inflator 22 flows into and expands an inflatable portion or chamber 36 of the airbag cushion 24, increasing the internal pressure of the cushion, while unfolding and deploying the airbag cushion 24 away from the fixing location 28 to restrain the occupant 18. As shown in FIG. 26, the activation of the airbag module 120 may be initiated by another vehicle device, such as an electronic control module 111. For example, the electronic control module 111 may receive data from vehicle sensors 113 and based on evaluation of the data may initiate the inflator 122 to inflate the airbag cushion 124 of the airbag module 120. Additionally, the electronic control module 111 may also activate other elements or components of the airbag module 120, such as a vent mechanism 140 of the airbag module 120. For example, the electronic control module 111 may activate release of a tether in order for the vent mechanism 140 to move from a closed (or non-venting position) to an open (or venting position).

FIGS. 5-21 illustrate an exemplary embodiment of the airbag cushion 24 that includes a first (or side) panel 32, a second panel 34, and a vent mechanism 40. According to other embodiments, the airbag cushion may include one panel or a plurality of panels and a vent mechanism 40. The panels (e.g., the first panel 32, the second panel 34) may be made from a high-strength woven nylon fabric or may be made using any suitable material, and may be coupled together by stitching or any suitable method (e.g., adhesives) to form at least one inflatable portion or chamber 36. The shape and size of the panels vary based on type of airbag (e.g., front, side, etc.) and may be tailored to meet varying customer requirements.

Figure 5:
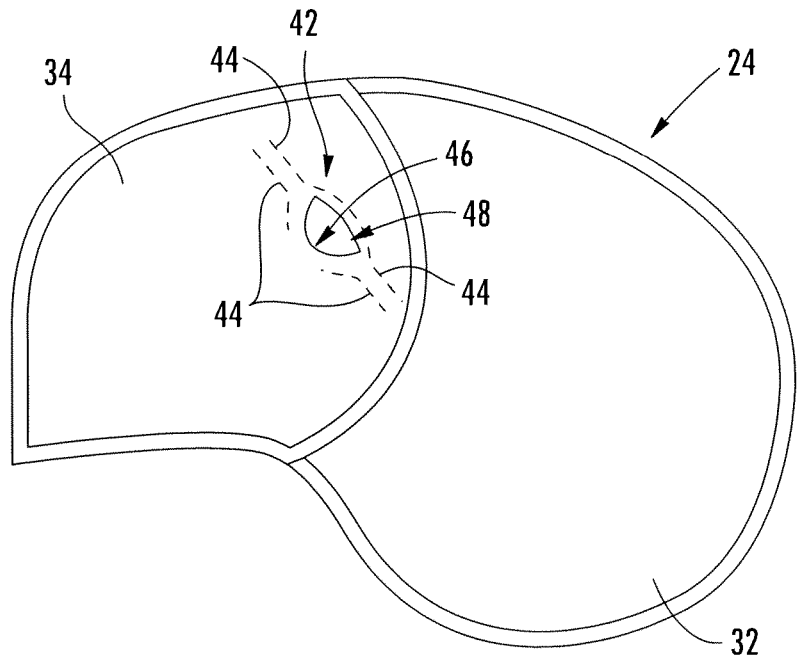
FIG. 5 is a side view of an exemplary embodiment of an airbag cushion for use in an airbag module.

The second panel 34 may couple to the first panel 32 using any suitable method (e.g., stitching, adhesive, etc.) at a coupling location 44 to form a vent pocket 42 (e.g., an active vent pocket) between the first and second panels 32, 34. The coupling location 44 may be located anywhere on the airbag cushion 24 and the airbag cushion 24 may include any number of coupling locations 44. As shown in FIG. 5, the second panel 34 may be stitched to the first panel 32 in four coupling locations 44 to form the vent pocket 42. Two stitched coupling locations 44 may be located on each side of an opening 46 in the second panel 34, whereby the two stitched coupling locations 44 on each side of the opening 46 may be substantially parallel and offset at a distance. The offset distance may be varied to adjust the size of the vent pocket 42 formed between the panels 32, 34 to accommodate different sized vent members 50. For example, if a smaller vent member 50 is used, then a smaller vent pocket may be used to as well. The stitch quantity, locations and configuration may vary, and the illustrations herein should not be considered as limitations. For example, the coupling locations do not have to be parallel to each other, and may be configured to be tapered or curved.

The offset distance or width between the coupling locations 44 of the vent pocket 42 relative to the width of the configured (e.g., rolled, folded) vent member 50 may be varied to tailor the forces retaining the vent member 50 within the vent pocket 42 during airbag deployment. For example, a vent pocket 42 having a relative narrower offset distance between the coupling locations 44 may retain a similarly configured vent member 50 for a longer period of time, since the narrower vent pocket 42 may exert higher retention forces onto the vent member 50. Accordingly, the vent member 50 may be configured to deploy during a later stage of airbag deployment to tailor the venting of the airbag cushion. Alternatively, the vent pocket 42 may be configured to allow the vent member 50 to deploy during an earlier state of airbag deployment to allow inflation gas to escape the airbag cushion earlier.

The first panel 32 may include a first opening 48 or a plurality of openings (e.g., apertures, vent holes) to permit inflation gas to escape during deployment of the airbag cushion 24. The first opening 48 may be any suitable shape (e.g., round, square, etc.) and may be any suitable size, which may be tailored based on the desired flow rate of inflation gas to escape through the vent mechanism 40 of the airbag cushion 24. According to an exemplary embodiment, the first panel 32 may include a round first opening 48 located between the stitched coupling locations 44 used to couple the second panel 34 to the first panel 32 of the airbag cushion 24.

Figure 19:
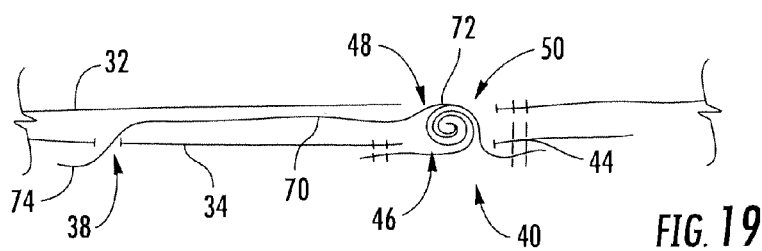
FIG. 19 is a cross-sectional view taken along line 19-19 in FIG. 18, illustrating the vent mechanism configured in the closed or non-venting position.

The second panel 34 may include a second opening 46 or a plurality of openings (e.g., apertures, vent holes) to permit inflation gas to escape during deployment of the airbag cushion 24. The second opening 46 may be any suitable shape (e.g., round, square, etc.) and may be any suitable size, which may be tailored based on the flow rate of inflation gas desired to escape through the vent mechanism 40 of the airbag cushion 24. The size and/or location of the second opening 46 in the second panel 34 may be different than the size and/or location of the first opening 48 in the first panel 32. Alternatively, the size and/or location of the second opening 46 in the second panel 34 may be similar to the size and/or location of the first opening 48 in the first panel 32 to allow gas to pass through the first opening 48 in the first panel 32 then through the second opening 46 in the second panel 34 to escape from the inflatable chamber 36, when the vent mechanism 40 is configured in the open or venting position. According to an exemplary embodiment, the second panel 34 may include a round or elliptical second opening 46 located between the stitched coupling locations 44 that couple the second panel 34 to the first panel 32, so that the second opening 46 of the second panel 34 includes at least a portion that is overlapping with the first opening 48 of the first panel 32, such as shown in FIG. 19.

Figure 24:
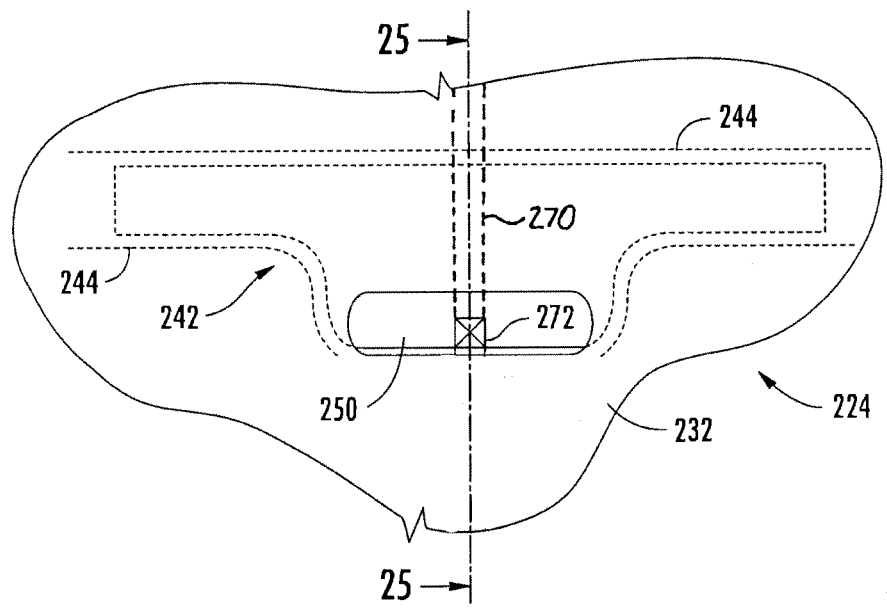
FIG. 24 is another example of an airbag cushion configured with a vent pocket that is offset from the opening.
Figure 25:
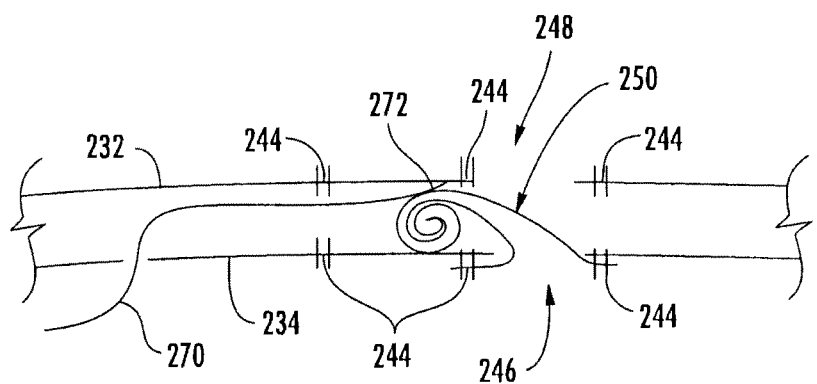
FIG. 25 is a cross-sectional view taken along line 25-25 in FIG. 24, illustrating the rolled portion of the vent member offset from the coupling locations.

As shown in FIGS. 24 and 25, an airbag cushion 224 may include a first panel 232 having a first opening 248 that may be provided between a first coupling location 244 and a second coupling location 244, which may couple the first panel 232 to a second panel 234. The second panel 234 may include a second opening 246 that is configured between the first and second coupling locations 244. The airbag cushion 224 may also include a third coupling location 244, wherein the second and third coupling locations 244 may form a vent pocket 242 configured to store the manipulated (e.g., rolled, folded, etc.) vent member 250 therein. Accordingly, the rolled portion of the vent member 250 may be placed in the vent pocket 242 between the second and third coupling locations 244 for storage. In other words, the rolled portion of the vent member 250 may be offset from the second opening 246 in the second panel 234 and the first opening 248 in the first panel 232. This configuration allows the inflation gas to enter the vent member 250 during an earlier state of airbag deployment. For example, the vent member 250 may include a portion that is not rolled and opens up to the second opening 246 in the second panel 234, wherein the inflation gas may enter the vent member 250 through the portion that is not rolled to thereby impart forces to expedite deployment of the vent member 250, upon reduction (or release) of the tension maintaining the vent member 250 in the closed (or non-venting) position. Alternatively, the first opening in the first panel may be aligned with the rolled (and/or folded) portion of the vent member and may be configured offset from the second opening in the second panel. As another alternative, the second opening in the second panel may be aligned with the rolled (and/or folded) portion of the vent member and may be configured offset from the first opening in the first panel. It should be noted that the airbag cushion and vent pocket of the airbag cushion may be configured with the first and second openings configured approximately in line (e.g., substantially concentric) with each other, offset from each other with a portion of overlap, or offset from each other with no overlapping portion.

Figure 27:
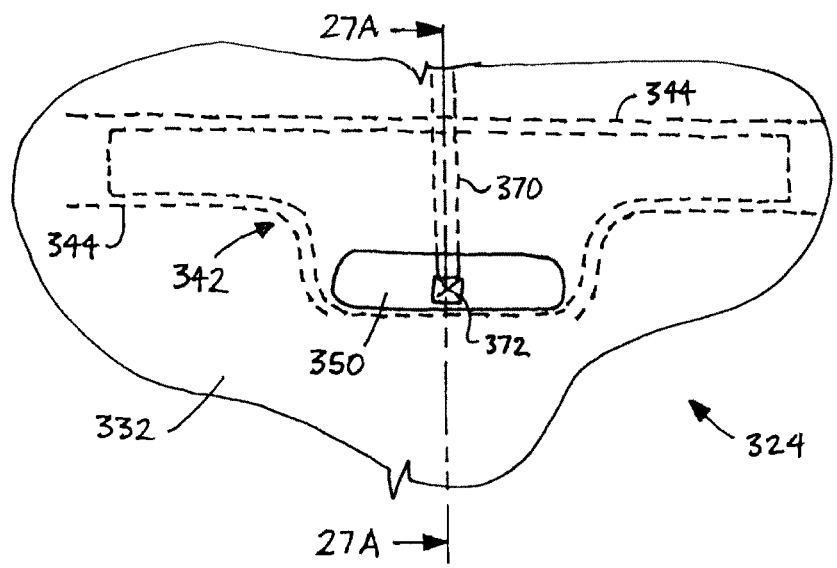
FIG. 27 is another example of an airbag cushion configured with a vent pocket and a vent member.
Figure 27A:
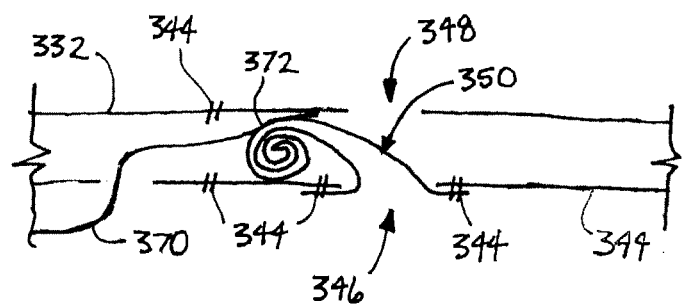
FIG. 27A is a cross-sectional view taken along line 27A-27A in FIG. 27.

As shown in FIGS. 27 and 27A, an airbag cushion 324 may include a first panel 332 having a first opening 348 that may be aligned with a second opening 346 in a second panel 334. The airbag cushion 324 may also include a vent pocket 342 formed by the coupling locations 344 that may be offset from the first and second openings 348, 346, wherein the vent pocket 342 may store a vent member 350 therein. The vent member 350 may be manipulated (e.g., folded, rolled, etc.) into a stored position within the vent pocket 342.

Figure 28:
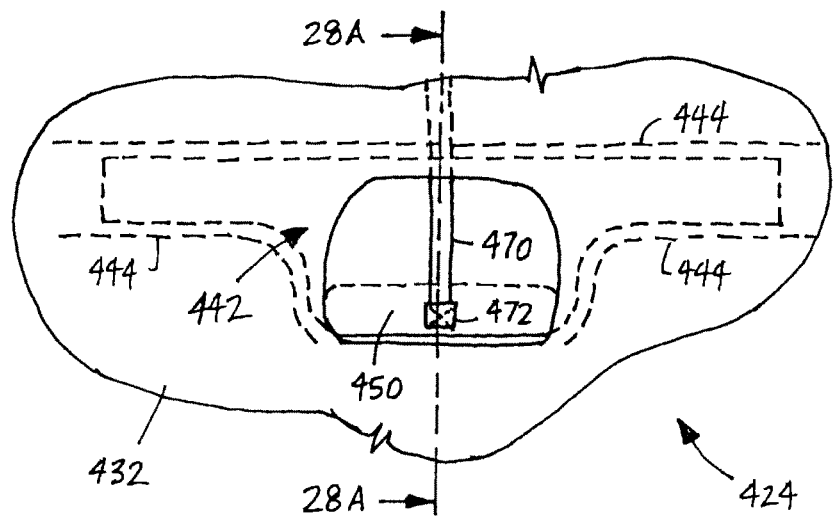
FIG. 28 is another example of an airbag cushion configured with a vent pocket and a vent member.
Figure 28A:
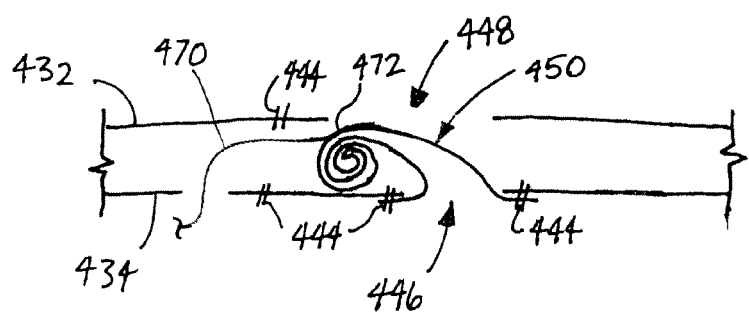
FIG. 28A is a cross-sectional view taken along line 28A-28A in FIG. 28.

As shown in FIGS. 28 and 28A, an airbag cushion 424 may include a first panel 432 having a first opening 448 that may be aligned with a second opening 446 in a second panel 434, wherein the first opening 448 is larger in size (e.g., width) relative to the second opening 446. The airbag cushion 424 may also include a vent pocket 442 formed by a plurality of coupling locations 444 that may be offset from the second opening 446, wherein the vent pocket 442 may store a vent member 450 therein. The vent member 450 may be manipulated (e.g., folded, rolled, etc.) into a stored position within the vent pocket 442.

Figure 29:
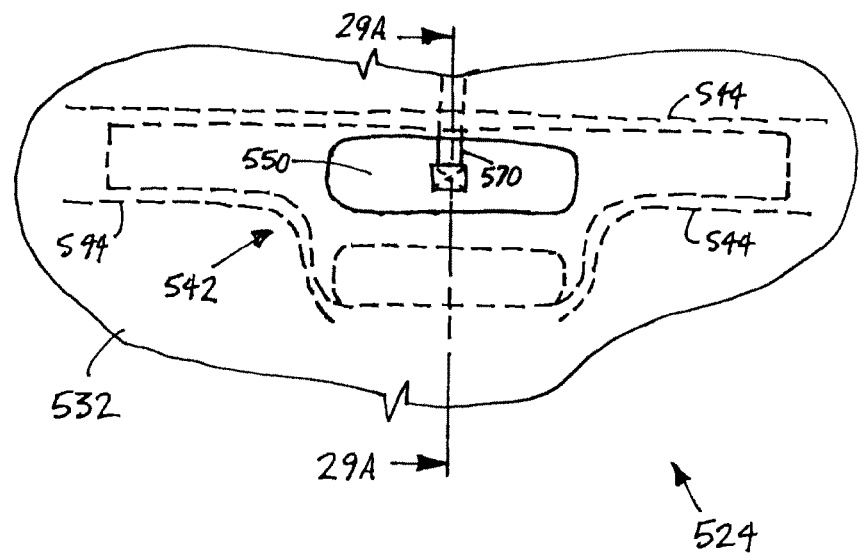
FIG. 29 is yet another example of an airbag cushion configured with a vent pocket and a vent member.
Figure 29A:
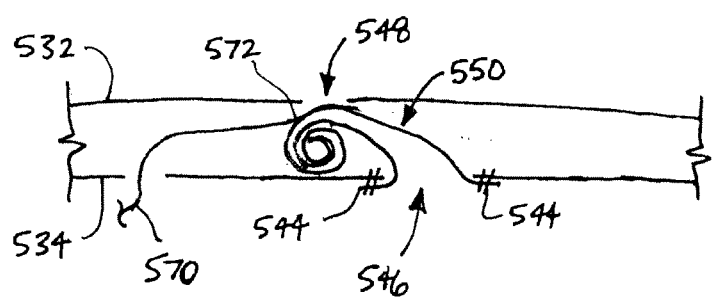
FIG. 29A is a cross-sectional view taken along line 29A-29A in FIG. 29.

As shown in FIGS. 29 and 29A, an airbag cushion 524 may include a first panel 532 having a first opening 548 that may be offset from a second opening 546 in a second panel 534, wherein the first and second openings 548, 546 may also be similar or dissimilar in size. The airbag cushion 524 may also include a vent pocket 542 formed by the coupling locations 544 that may be offset from the second opening 546 and aligned with the first opening 548, wherein the vent pocket 542 may store a vent member 550 therein. The vent member 550 may be manipulated (e.g., folded, rolled, etc.) into a stored position within the vent pocket 542.

Also shown in FIG. 25, a first end 272 of a tether 270 may be coupled to the vent member 250 to provide a tension force to retain the vent member 250 in a closed position, in which the vent member 250 prohibits inflation gas to escape from the airbag cushion 224 through the first opening 248. The tether 270 may retain the vent member 250 in the closed position during a portion of the airbag deployment (e.g., predetermined period of time of deployment), then the tension in the tether 270 may be reduced enough to allow the vent member 250 to expand through the first opening 248 to allow inflation gas to escape the airbag cushion.

Also shown in FIGS. 27-29A, the airbag cushions 324, 424, 524 may include tethers 370, 470, 570 that are configured to impart a tension force on the vent members 370, 470, 570 to thereby retain the vent members 370, 470, 570 in closed (or non-venting) positions to prohibit the release or escape of inflation gas from the airbag cushions. The tethers 370, 470, 570 may include first ends 372, 472, 572 that couple to the vent members 370, 470, 570 to impart the tension forces. The tethers 370, 470, 570 may be configured to release or reduce the tension, such as during airbag deployment, in order to allow the vent members 370, 470, 570 to thereby move to open (or venting) positions to allow inflation gas to escape the airbag cushions.

According to an exemplary embodiment, an electromechanical active cushion vent mechanism 40 includes a vent member 50 (e.g., a vent flap) and a release mechanism (not shown). The vent mechanism 40 may also include a tether 70 (e.g., a strap). The vent mechanism 40 is configured to have two positions, a first closed (or non-venting position) and a second open (or venting position). The vent mechanism 40 is configured to prohibit inflation gas from escaping from the airbag cushion 24 (e.g., the inflatable chamber 36) through the one or more openings (e.g., the first opening 48, the second opening 46) of the vent mechanism 40 when configured in the closed or non-venting position. The vent mechanism 40 is configured to permit inflation gas to escape from the airbag cushion 24 (e.g., the inflatable chamber 36) through the one or more openings (e.g., the first opening 48, the second opening 46) of the vent mechanism 40 when configured in the open or venting position.

Figure 6:
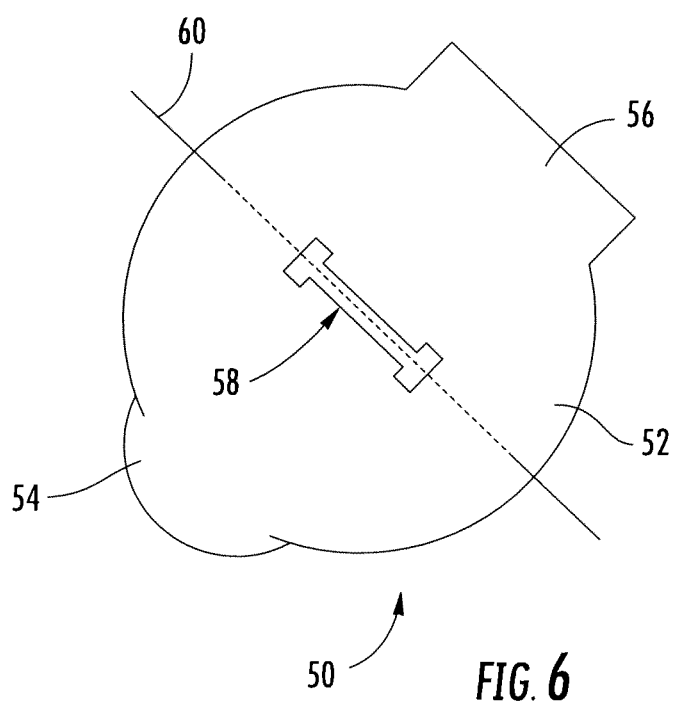
FIG. 6 is a side view of an exemplary embodiment of a vent member for use in an airbag module.

The vent member 50 may be made of high-strength woven fabric, such as woven-nylon fabric, or any other suitable material, and may have any suitable shape. The size and shape of the vent member 50 may be tailored based on the size and shape of the vent pocket 42 and/or the openings 46, 48 in the panels 34, 32. As shown in FIG. 6, the vent member 50 may include a body 52 (e.g., body portion) that is substantially round, a first end 54 extending from the body 52 in a first direction, and a second end 56 extending from the body 52 in a second direction that may be substantially opposite from first direction of the first end 54. The first and second ends 54, 56 may have any suitable shape (e.g., semi-circular, rectangular, etc.) and may extend in any suitable direction, which may be similar or different.

The vent member 50 may further include an aperture 58 (e.g., a hole, an opening, an outlet) to allow gas to escape therethrough when the vent mechanism 40 is configured in the open or venting position. According to an exemplary embodiment, the aperture 58 of the vent member 50 may be a slit that extends along a fold line 60, as shown in FIG. 6, a length that is less than the width of the vent member 50 at that corresponding section. The aperture 58 may be shaped to include end sections that are larger than a middle section. It should be noted that the aperture of the vent member may form any suitable shape (e.g., round, square, triangle, polygon, etc.), may have any suitable size, and may be located anywhere on the vent member.

Figure 7:
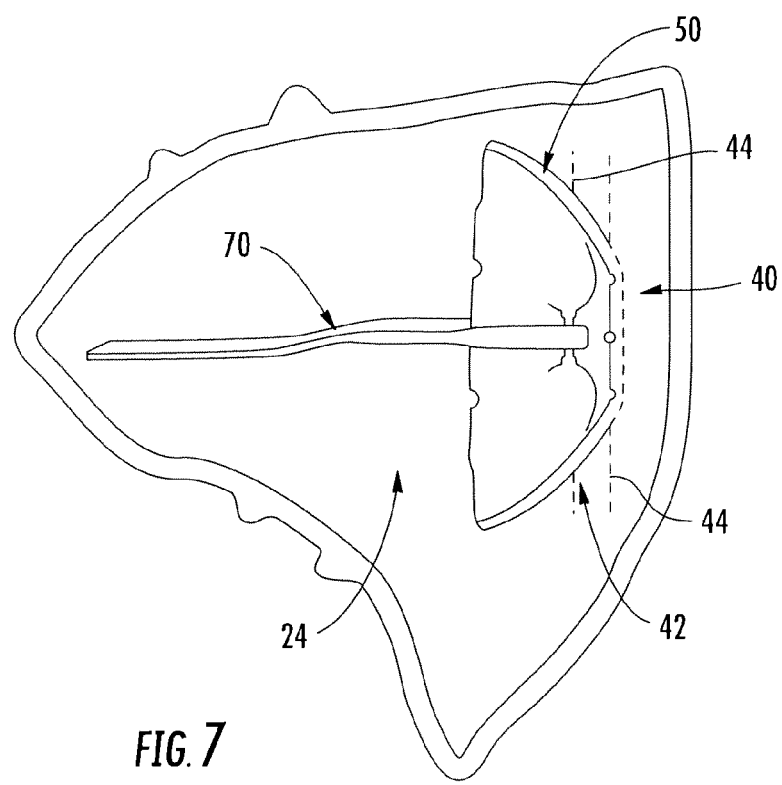
FIG. 7 is a side view of a vent member coupled to an airbag cushion.
Figure 8:
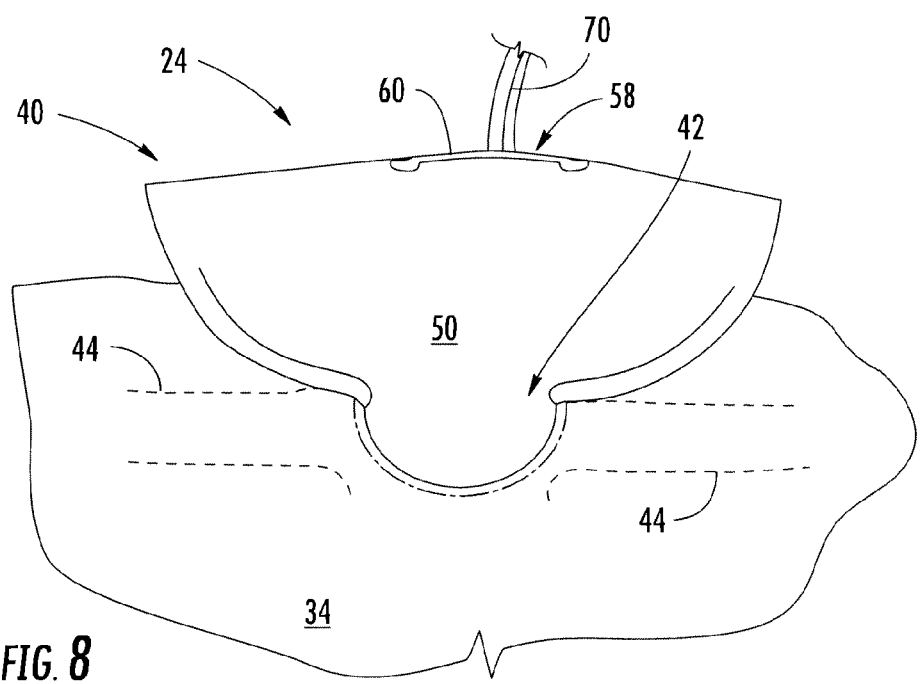
FIG. 8 is a perspective view of the external surface of the airbag cushion having a vent member protruding through a vent pocket and away from the airbag cushion.
Figure 9:
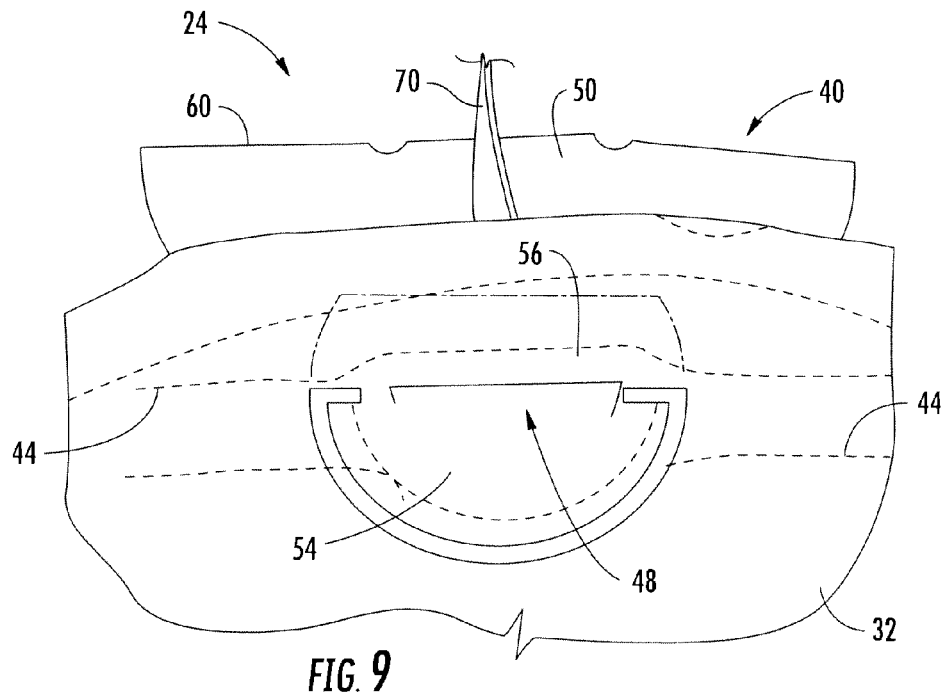
FIG. 9 is a perspective view of the internal surface of the airbag cushion having a vent member coupled thereto and protruding through the vent pocket.

The vent member 50 may be coupled, such as by stitching, to the airbag cushion 24. According to an exemplary embodiment, the vent member 50 is folded in half along the fold line 60, so that the second end 56 of the vent member 50 is adjacent to the first end 54, whereby the vent member 50 forms a substantially crescent shape, as shown in FIG. 7. The first and second ends 54, 56 of the vent member 50 may be inserted into the openings 46, 48 (of the vent pocket 42) in the second and first panels 34, 32, such that a portion of the first end 54 of the vent member 50 abuts a portion of the inside surface of the first panel 32 and a portion of the second end 56 of the vent member 50 abuts a different portion of the inside surface of the first panel 32. As shown in FIG. 9, the portion of the first panel 32 that abuts the first end 54 of the vent member 50 may be located on one side of the first opening 48 in the first panel 32, and the portion of the first panel 32 that abuts the second end 56 of the vent member 50 may be located on the opposite side of the first opening 48 in the first panel 32.

Figure 10:
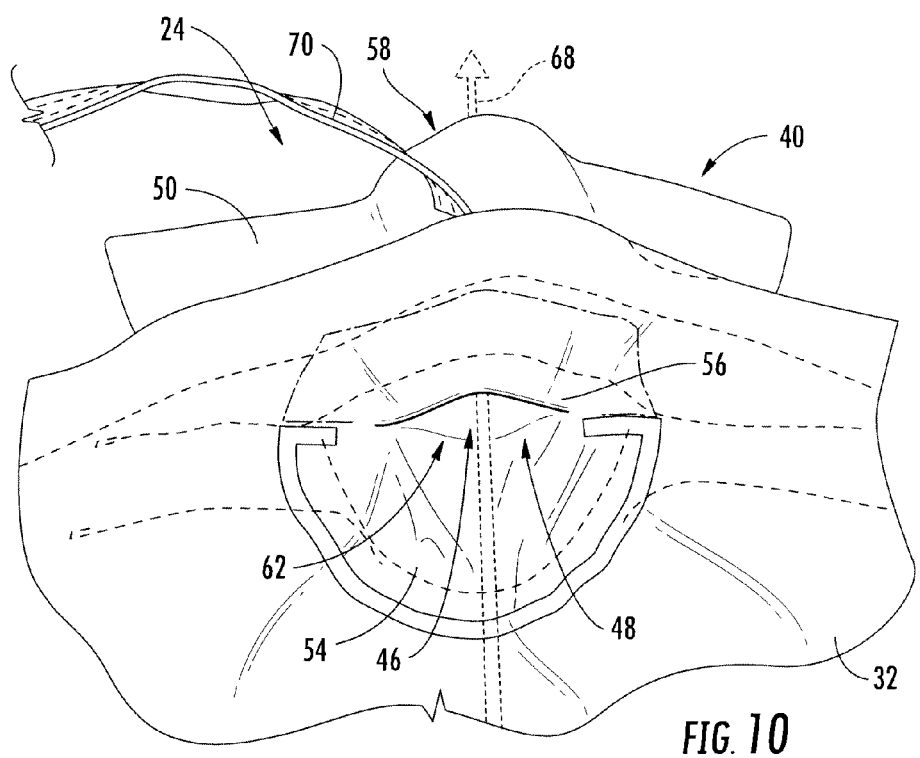
FIGS. 10 and 11 are perspective views of an internal opening or passage formed by coupling a vent member to an airbag cushion.
Figure 11:
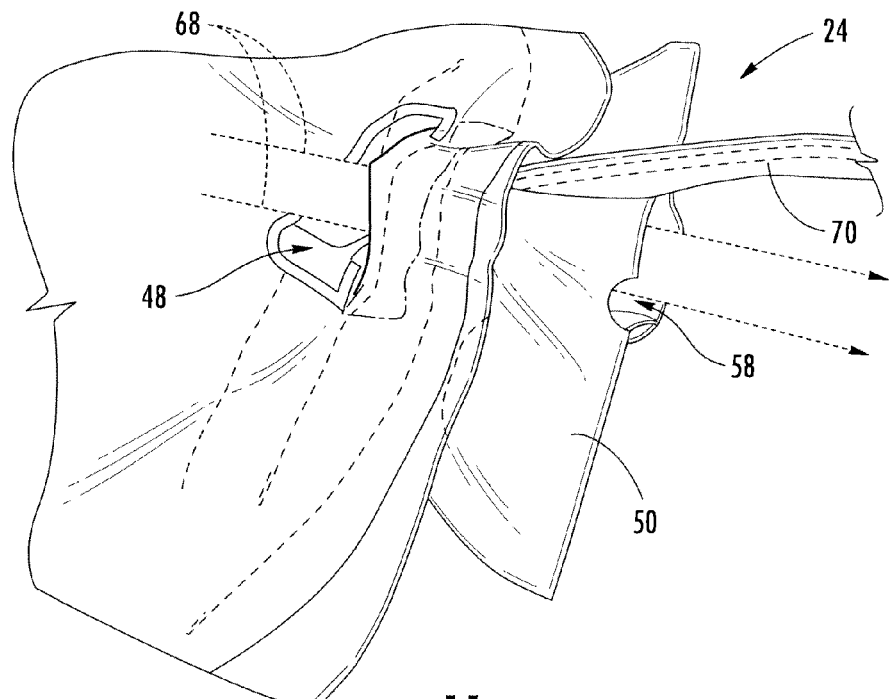

The first and second ends 54, 56 of the vent member 50 may be stitched to the abutting portions of the first panel 32 of the airbag cushion 24, such that the first opening 48 remains in the first panel 32 and defines a passage 62 that passes through the airbag cushion 24 and the vent member 50, as shown in FIG. 10. When the vent mechanism 40 is configured in the open or venting position, the passage 62 that remains is configured to allow gas to escape the airbag cushion through the fluid flow direction illustrated by arrows 68. The passage 62 may be defined by the first opening 48, the second opening 46 and the aperture 58.

Figure 12:
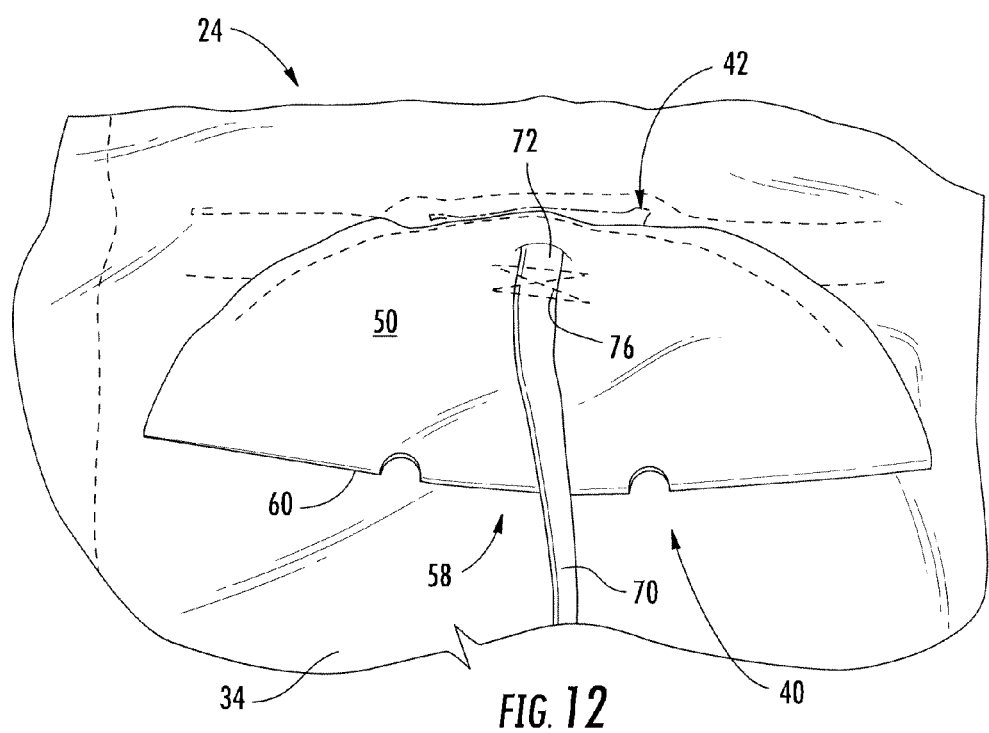
FIG. 12 is a perspective view of the external surface of an airbag cushion having a vent member protruding through a vent pocket and folded toward the airbag cushion.

The tether 70 (e.g., the strap) may be made of high-strength woven fabric or any suitable material and may have any suitable shape. The tether 70 may be a thin and narrow strap having a first end 72 and a second end 74. The first end 72 of the tether 70 may be coupled to the body 52 of the vent member 50, such as shown in FIG. 12, using stitching 76 or any suitable coupling method. The second end 74 of the tether 70 may be coupled to a release mechanism (not shown) and/or to the airbag module 20. For example, the second end 74 of the tether 70 may be detachably coupled to the release mechanism.

Figure 14:
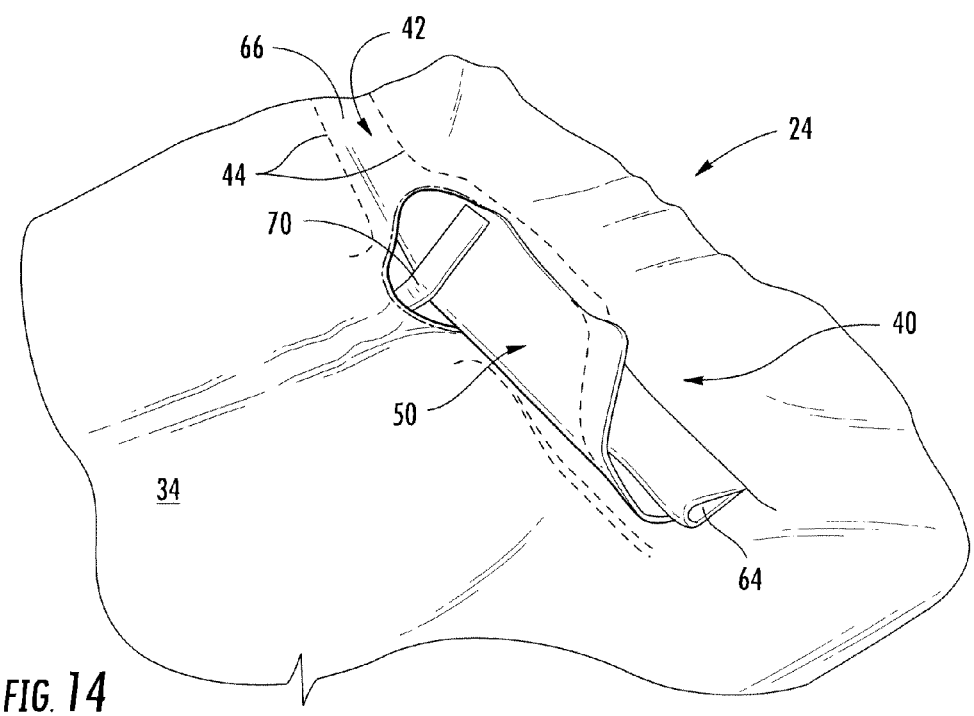
FIGS. 14 and 15 are perspective views of a rolled vent member having one rolled end positioned in a vent pocket of an airbag cushion.

The tether 70 (e.g., via the second end 74 of the tether 70) may be routed between the second panel 34 and the first panel 32 of the airbag cushion 24, such as shown in FIGS. 14 and 19, whereby the second end 74 may be coupled to the release mechanism (not shown). Alternatively, the tether 70 may be routed along the outer surface of the second panel 34, may be routed along the inner surface of the first panel 32, or may be routed along any suitable path or location and may be coupled to the release mechanism or to any suitable feature of the airbag module 20.

Figure 13:
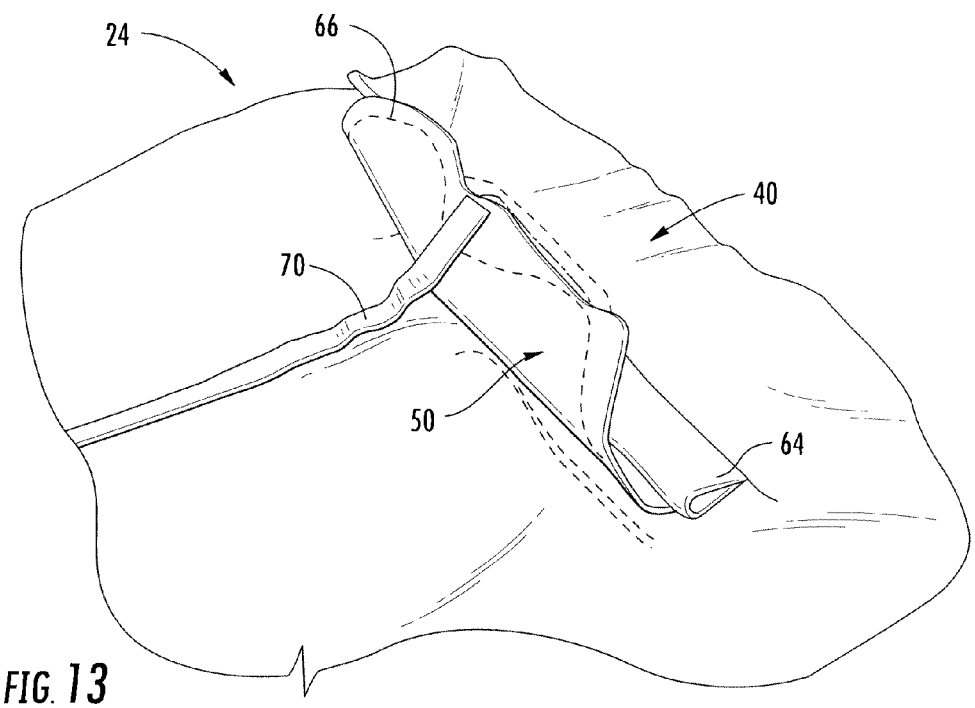
FIG. 13 is a perspective view illustrating a vent member rolled into a manipulated configuration that may be placed in the vent pocket.

The vent member 50 may be manipulated into a stored configuration, which may be retained by the vent pocket 42 prior to deployment of the airbag cushion 24. The stored configuration of the vent member 50 may be formed by first folding the vent member 50 then rolling the vent member 50. As shown in FIG. 12, the first end 54 of the vent member 50 may be folded onto the second end 56 of the vent member 50 forming a fold line 60, wherein that the first and second ends may be coupled (e.g., stitched) to the first and second panels 32, 34 of the airbag cushion 24. As shown in FIG. 13, the vent member 50 may then be rolled starting with the edge formed by the fold line 60 toward the first and second ends 54, 56 of the vent member 50 that are coupled to the airbag cushion 24 to form an exemplary embodiment of a stored configuration of the vent member 50, which may be placed into the vent pocket 42. The vent member 50 may be rolled in a direction toward (or away from) the second end 74 of the tether 70, whereby the rolled vent member 50 may be located adjacent to the first end 72 of the tether 70, as shown in FIG. 19. The rolled vent member 50 may extend substantially perpendicular to the length of the tether 70. The first end 72 of the tether 70 may be coupled to a portion of the stored (e.g., rolled) vent member 50. This configuration allows tension in the tether 70 to counteract and overcome the forces working to unroll the stored vent member 50, thus retaining the vent member 50 in the rolled configuration, such as until the tether is released or until a threshold tension level is reached.

Figure 22:
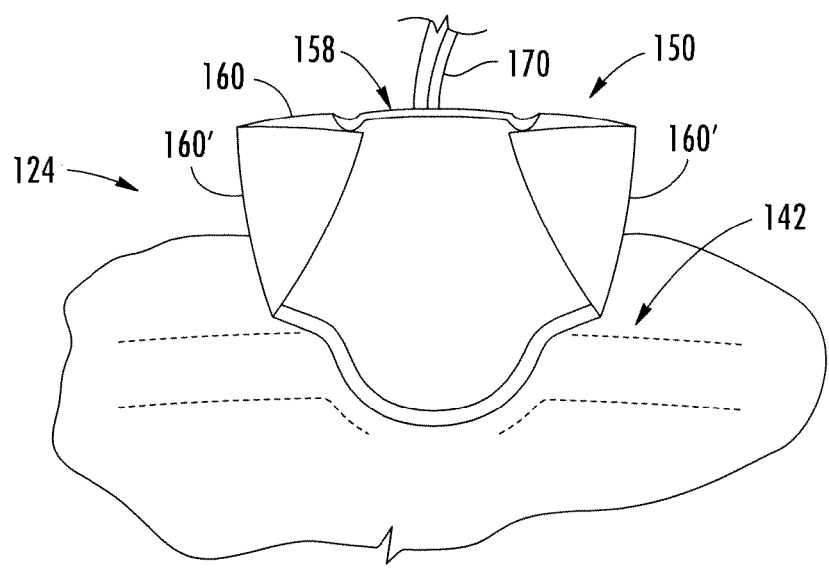
FIG. 22 is a perspective view of an airbag cushion having a vent member protruding through a vent pocket and with a second fold.
Figure 23:
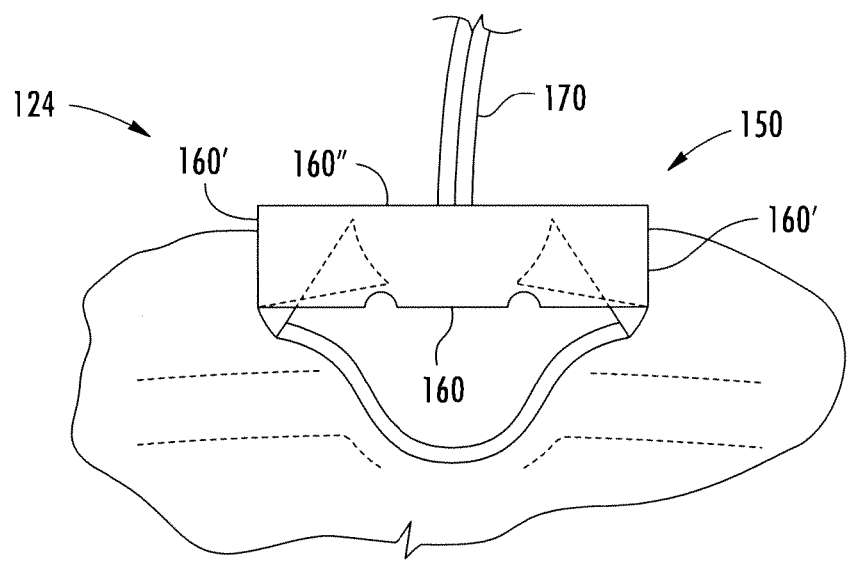
FIG. 23 is a perspective view of the airbag cushion of FIG. 22 having a vent member configured with a third fold.

As shown in FIGS. 22-23, the vent member 150 may also be manipulated into the stored configuration using more than one fold, in order for the vent member 150 to be inserted into the vent pocket 142 of the airbag cushion 124. The vent member 150 may include a first fold along a first fold line 160, wherein the ends of the vent member 150 may be adjacent to one another for coupling to the airbag cushion 124. The first fold line 160 may be along the aperture or opening 158, as shown in FIG. 22. The vent member 150 may also include two second folds, each second fold along a second fold line 160' whereby the a portion of the sides (e.g., wings) of the vent member 150 are folded back over and onto the body of the vent member 150. The vent member 150 may also include a third fold along a third fold line 160", as shown in FIG. 23. The third fold may involve folding the upper half of the body of the vent member 150 to be adjacent to the lower half of the body, wherein the aperture 158 faces away from the third fold line 160" of the vent member 150. The third fold may involve folding the upper half of the body over the lower half of the body on the surface of the lower half that is opposite to the surface in which a tether 170 is coupled to. It should be noted that the vent member may be manipulated into other stored configurations, whereby the vent member may be rolled, folded, manipulated using a combination of rolling and folding, or using any suitable method to form different stored configurations. Accordingly, the stored configurations illustrated herein should not be considered as limitations.

Figure 15:
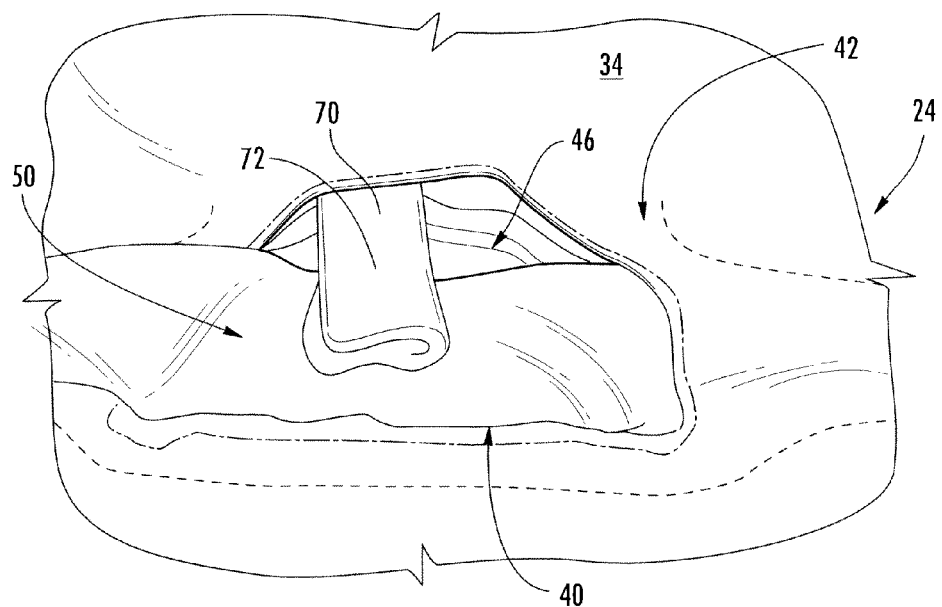
Figure 16:
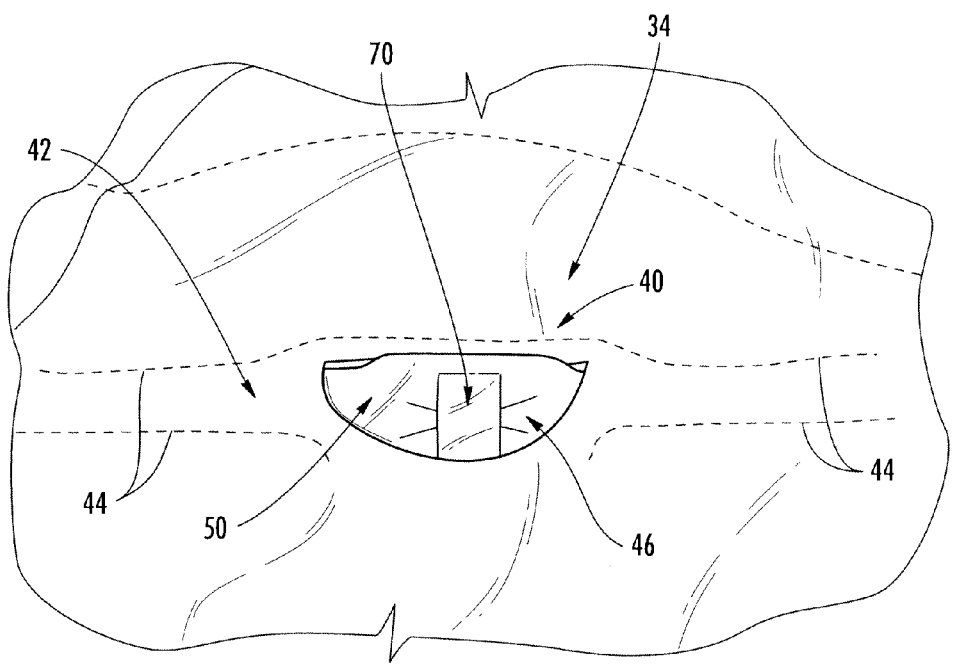
FIG. 16 is a perspective view of both ends of a rolled vent member positioned in a vent pocket of the airbag cushion.
Figure 17:
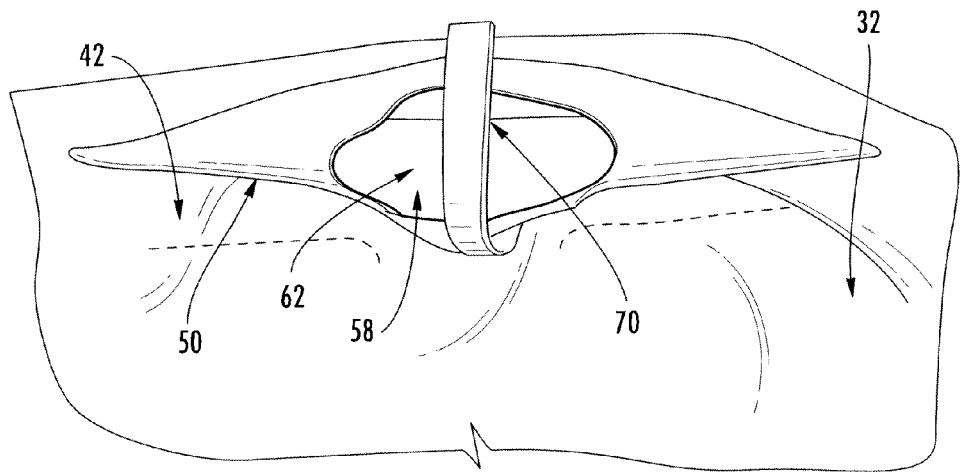
FIG. 17 is a perspective view of a vent member extending away from an airbag cushion.

As shown in FIG. 13, the rolled vent member 50 may form a first rolled end 64 and a second rolled end 66 in the stored configuration. According to an exemplary embodiment, the first and second rolled ends 64, 66 of the vent member 50 may be inserted in the vent pocket 42, whereby the vent pocket 42 may retain the first and second rolled ends 64, 66 therein. When the vent member 50 is manipulated in the stored configuration (e.g., rolled, folded, etc.) the aperture 58 in the vent member 50 may be closed or blocked (e.g., covered) to prevent the escape of inflation gas through aperture 58. FIGS. 14 and 15 illustrate the second rolled end 66 of the rolled vent member 50 being retained in a portion of the vent pocket 42, and FIG. 16 illustrates the first and second rolled ends 64, 66 of the rolled vent member 50 being retained in the vent pocket 42. When configured in the closed or non-venting position, as shown in FIG. 16, the vent member 50 may fill the vent pocket 42 and may cover the first opening 48 in the first panel 32 of the airbag cushion 24 to prohibit inflation gas from escaping through the cushion, such as through the first opening 48 of the first panel 32, during at least part of the inflation period (or time) of the airbag cushion 24.

Figure 18:
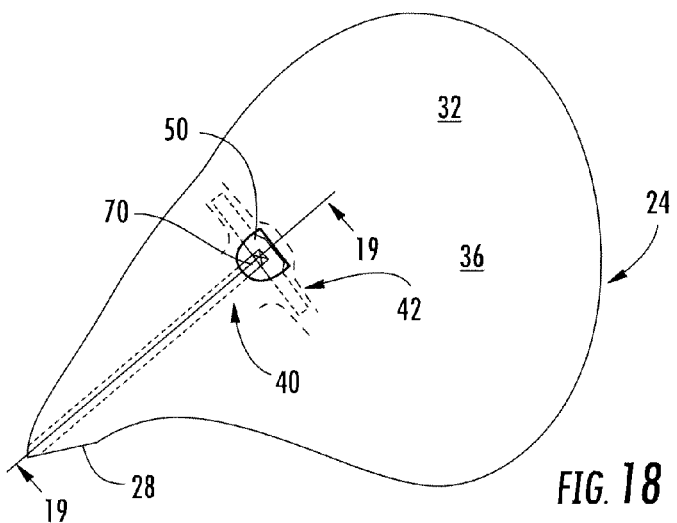
FIG. 18 is a side view of a deploying airbag cushion having an active vent mechanism that is configured in the closed or non-venting position.

FIGS. 18 and 19 illustrate the airbag module 20 that includes an airbag cushion 24 and a vent mechanism 40 with the airbag cushion 24 deployed and with the vent mechanism 40 in the closed or non-venting position. During the early or initial stages of airbag deployment, when the vent member 50 is configured in the closed or non-venting position, the vent member 50 may remain in the vent pocket 42 covering the first opening 48 in the first panel 32 and/or the second opening 46 in the second panel 34 to prohibit inflation gas from escaping through the opening of the first panel 32 and/or the second panel 34 of the airbag cushion 24. During airbag deployment, the inflation gas increases the internal pressure in the inflatable chamber 36 of the airbag cushion 24, which expands the airbag cushion 24 and imparts forces onto the vent member 50 trying to expand the vent member 50. The airbag module 20 may include a device (e.g., a tether) that counteracts the forces trying to expand the vent member 50. During the later stages of airbag deployment, the counteracting device (e.g., the tether) may be activated (e.g., overcome, release, unwind, etc.), which allows the vent member 50 to move from the closed position to the open (or venting) position. For example, upon release of the tether, the increased internal pressure of the airbag cushion 24 thereby generates forces that induce the stored (e.g., rolled) vent member 50 to move (e.g., unroll, deploy), such as through the first opening 48 in the first panel 32, to the open position or configuration.

The tether 70 may act as a counteracting device to selectively prohibit movement (e.g., unrolling) of the vent member 50 from the closed position to the open position. The tether 70 may be put into tension by the expanding airbag cushion 24 and the tension in the tether 70 imparts forces into the stored (e.g., rolled) vent member 50 that overcome the forces inducing movement (e.g., unwinding) of the vent member 50. Hence, when the vent mechanism 40 is in the non-venting or closed position, the tether 70 retains the rolled vent member 50 in the rolled or stored position covering the vent hole in the airbag cushion, which prohibits inflation gas from escaping through the first opening 48 in the first panel 32 and/or through the second opening 46 of the second panel 34. Therefore, when the vent mechanism 40 is configured in the closed position, gas remains trapped inside the inflatable chamber 36 of the airbag cushion 24, thus increasing the internal pressure (and stiffness) of the cushion and expanding the airbag cushion 24 to a deployed position.

The tension that the tether 70 is subjected to during deployment may be controlled by the electromechanical active cushion vent mechanism 40, such as by an actuator. According to an exemplary embodiment, the second end 74 of the tether 70 is coupled to an actuator (not shown) and the first end 72 of the tether 70 is coupled to the vent member 50. As shown in FIG. 19, the airbag cushion (e.g., the second panel 34) may include a slit 38 (e.g., opening, aperture, hole) that allows the second end 74 of the tether 70 to pass therethrough in order for the second end 74 to be coupled to a tension controlling device (e.g., release mechanism). The length of the tether 70 may be tailored based on the distance, when the airbag is deployed, from the release mechanism to the vent member 50. The actuator (e.g., release mechanism) may communicate with another vehicle device, such as the electronic control module

111, whereby the electronic control module 111 may actuate (e.g., activate) the actuator, during airbag deployment, based on input from vehicle sensors. When the actuator is actuated, the second end 74 of the tether 70 that is coupled to the actuator is allowed to move freely (e.g., released), such that the tension in the tether 70 is relieved or reduced enough to allow the vent mechanism 40 to move from the closed position to the open or venting position.

Figure 20:
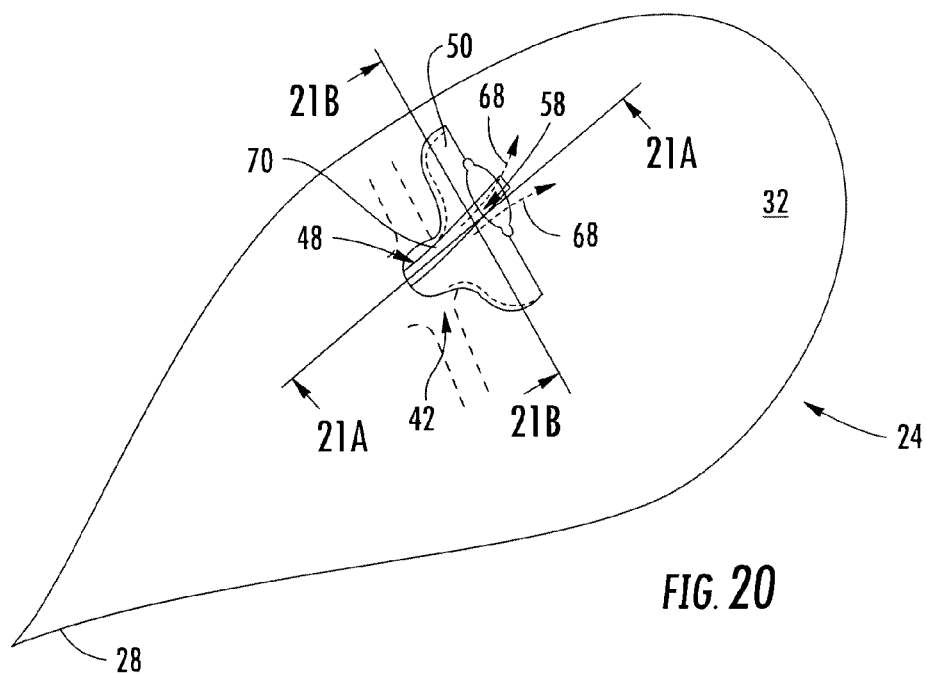
FIG. 20 is a side view of a deploying airbag cushion having an active vent mechanism that is configured in the open or venting position.
Figure 21A:
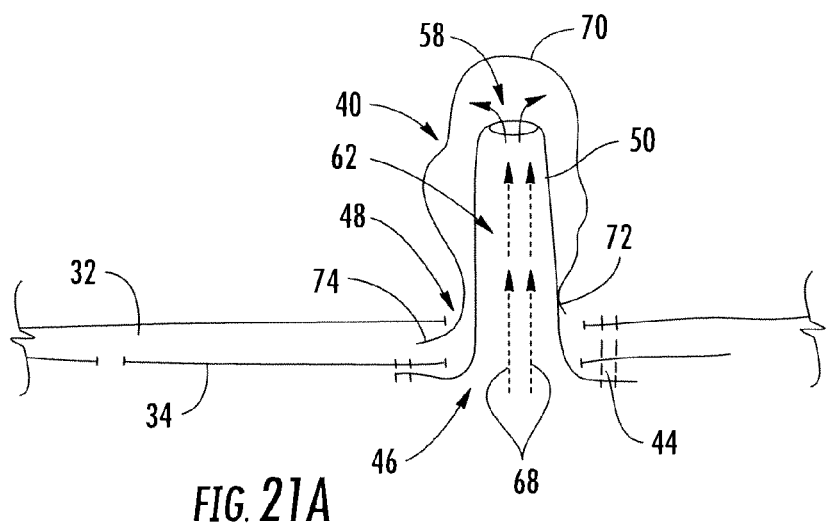
FIG. 21A is a cross-sectional view taken along line 21A-21A in FIG. 20, illustrating the vent mechanism configured in the open or venting position.
Figure 21B:
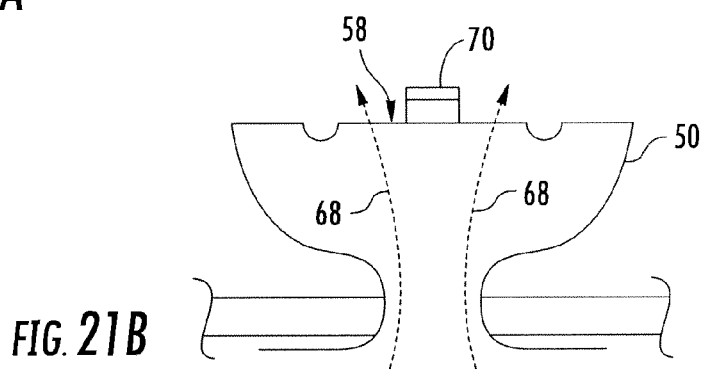
FIG. 21B is a cross-sectional view taken along line 21B-21B in FIG. 20, illustrating the vent mechanism configured in the open or venting position.

FIGS. 20 and 21 illustrate the airbag module 20 that includes the airbag cushion 24 and a vent mechanism 40 with the airbag cushion deployed and with the vent mechanism 40 in the open or venting position. In the open or venting position, the forces generated by the internal cushion pressure overcome the tension forces from the tether 70 (since the tether 70 no longer is in tension or has a reduced tension), whereby the internal cushion pressure induces the stored vent member 50 to move (e.g., unroll or unwind) to an open position, such as shown in FIG. 21. The open (e.g., unrolled) vent member 50 allows inflation gas to flow through the passage 62 (defined by the open vent member 50 passing through both the first and second openings 48, 46 in the panels 32, 34) to exit the airbag cushion 24 through the aperture 58 in the vent member 50. Thus, inflation gas is allowed to exit the airbag cushion 24 to reduce the internal pressure and resulting stiffness of the airbag cushion 24.

According to another exemplary embodiment, an electromechanical active cushion venting mechanism includes a vent member 50, a tether 70 (e.g., a strap), and an actuator (e.g., a displacement mechanism). The vent member 50 may be configured as disclosed above. The tether 70 may include a first end 72 and second end 74. The first end 72 of the tether 70 may be coupled to the vent member 50, as disclosed above, and the second end 74 of the tether 70 may be coupled to the displacement mechanism. The displacement mechanism may communicate with another vehicle device, such as the electronic control module 111, whereby the control module may actuate (e.g., control, activate) the displacement mechanism, during deployment of the airbag module, which may be based on input (e.g., data) from the sensors of the vehicle. According to an exemplary embodiment, the displacement mechanism may unwind the tether 70, so that the length of the tether 70 is increased or the tether 70 is extended, so that tension in the tether 70 is relieved or reduced accordingly.

When the displacement mechanism is actuated, the tether 70 may extend or unwind from the displacement mechanism, reducing or releasing the tension in the tether 70 depending on the length of the tether 70 extended or unwound, permitting the vent member 50 to move to the open or venting position thereby allowing inflation gas to pass through the passage 62 and escape through the aperture 58 in the vent member 50. The length of the tether 70 extended (e.g., unwound) may be varied based on the input from the vehicle sensors, such that the length that the tether 70 is extended may be tailored based on the crash severity. In other words, the length that the tether 70 is extended during deployment of the airbag cushion 24 may be tailored to control the amount of inflation gas that is permitted to escape from the airbag cushion 24 through the aperture 58 in the vent member 50, such as to tailor the stiffness of the airbag cushion 24.

The displacement mechanism of the electromechanical active cushion venting mechanism may also be configured to unwind and wind the tether (e.g., the strap). During the initial stage of airbag deployment, the tether may be put into tension to thereby keep the vent member in the closed or non-venting position to prohibit inflation gas from escaping the airbag cushion, which may speed deployment of the cushion (i.e., shorten the time required for the airbag cushion to go from the stored configuration to the inflated configuration). Then during the intermediate stage of airbag deployment, the displacement mechanism may unwind the tether enough to release or reduce the tension in the tether to thereby allow the vent member to move to the open or venting position to permit inflation gas to escape from the airbag cushion (e.g., the inflatable chamber). During the later (e.g., final) stage of airbag deployment, the displacement mechanism may wind the tether enough to put the tether into tension to thereby move the vent member back to the closed or non-venting position to prohibit inflation gas from escaping the airbag cushion.

An electromechanical active cushion venting mechanism may include a vent member, a strap, and a displacement mechanism. The vent member may be configured as disclosed above or may have any suitable configuration. The strap may include a first end, a second end and a mid-portion that is located between the first and second ends. The first end may be coupled to the vent member and the second end may be coupled to the airbag module. The mid-portion may include a length limiting mechanism, such as a fold, an eyelet, a slit, a loop, a pinch, or a tear stitch. The length limiting mechanism may provide tension during airbag deployment. During an airbag deploying event, the control module may communicate with the airbag module, such as with the displacement mechanism, to reduce or remove the tension in the mid-portion by allowing the strap to lengthen or extend, which allows the vent member to move to an open or venting position to permit inflation gas to escape. During deployment, the second end of the strap may remain coupled to the airbag module and/or the first end of the strap may remain coupled to the vent member, which may remain coupled to the airbag cushion. This reduces the possibility of the ends of the strap contacting the occupant during deployment of the airbag cushion.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbags as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for providing restraint to an occupant of a vehicle, comprising:
   an inflatable airbag cushion that includes a vent hole and a vent pocket;
   an inflator for generating inflation gas to inflate the airbag cushion during deployment;
   an actuator;
   a vent member configured to fill at least a portion of the vent pocket to selectively cover the vent hole of the cushion; and
   a tether having a first end and a second end, wherein the first end is coupled to the vent member and the second end is coupled to the actuator;
   wherein when the actuator has not been activated, the vent member remains in a first position covering the vent hole under a tension applied by the tether to thereby prevent inflation gas from escaping through the vent hole;
   wherein when the actuator has been activated, the tension is reduced enough to allow the inflation gas to move the vent member to a second position uncovering the vent hole thereby allowing inflation gas to escape through the vent hole and through the vent member.

2. The airbag module of claim 1, wherein the vent member is manipulated into a stored configuration to fill at least a portion of the vent pocket to cover the vent hole in the first position.

3. The airbag module of claim 2, wherein the stored configuration of the vent member includes at least one fold.

4. The airbag module of claim 2, wherein the stored configuration of the vent member includes at least one roll.

5. The airbag module of claim 3, wherein the stored configuration of the vent member further includes at least one roll.

6. The airbag module of claim 1, wherein the vent member includes an opening for the inflation gas to escape through to exit the airbag cushion.

7. The airbag module of claim 1, wherein the vent member includes a first end and a second end, wherein the first and second ends are coupled to the airbag cushion.

8. The airbag module of claim 1, wherein the airbag cushion includes a first panel and a second panel that are coupled together at least at one coupling location to form the vent pocket.

9. The airbag module of claim 8, wherein the vent member includes an end that is coupled to either the first panel or the second panel at a second coupling location.

10. The airbag module of claim 8, wherein the first panel includes a first opening and the second panel includes a second opening.

11. The airbag module of claim 9, wherein the first and second openings are configured to have an overlapping portion.

12. The airbag module of claim 1, wherein when the vent member is configured in the second position, at least a portion of the vent member is deployed from the vent pocket.

13. An airbag module for providing restraint to an occupant of a vehicle, comprising:
    an inflatable airbag cushion having a vent hole;
    an inflator for generating inflation gas to inflate the airbag cushion during deployment; and
    a vent member having a first stored position and a second open position;
    wherein when the vent member is in the first stored position the vent member includes at least one fold and covers the vent hole to thereby prevent inflation gas from escaping therethrough;
    wherein when the vent member is in the second open position, the vent hole is uncovered to thereby allow inflation gas to escape therethrough; and
    wherein the airbag cushion includes a first panel coupled to a second panel to form a vent pocket for retaining at least a portion of the vent member when in the first stored position.

14. The airbag module of claim 13, wherein when in the first stored position the vent member also includes a second fold.

15. The airbag module of claim 13, wherein when in the first stored position the vent member also includes a roll.

16. The airbag module of claim 13, wherein the first panel includes a first vent hole and the second panel includes a second vent hole.

17. The airbag module of claim 16, wherein the vent member is coupled to the second panel near the second vent hole and the vent member is configured to deploy from the first stored position to the second open position through the first vent hole of the first panel.

18. The airbag module of claim 13, further comprising a tether having a first end and a second end, wherein the first end is coupled to the vent member to provide tension to the vent member to maintain the vent member in the first stored position until actuation of the tether.

19. The airbag module of claim 18, further comprising an actuator to actuate the tether to allow the vent member to move from the first stored position to the second open position.

20. The airbag module of claim 19, wherein the second end of the tether is coupled to the actuator.

* * * * *